United States Patent [19]
Ueno et al.

[11] Patent Number: 5,012,428
[45] Date of Patent: Apr. 30, 1991

[54] VIBRATION CONTROL SYSTEM

[75] Inventors: Kazuyoshi Ueno, Nishinomiya; Katsushi Imoto, Itami, both of Japan

[73] Assignee: IMV Corporation, Osaka, Japan

[21] Appl. No.: 379,391

[22] Filed: Jul. 13, 1989

[30] Foreign Application Priority Data

Nov. 25, 1988 [JP] Japan .................. 63-298506

[51] Int. Cl.$^5$ .................................. G06F 15/20
[52] U.S. Cl. .................................. 364/508; 73/663
[58] Field of Search .............. 364/508, 154, 576; 73/663, 664, 665, 462

[56] References Cited

U.S. PATENT DOCUMENTS

| | | | |
|---|---|---|---|
| 3,710,082 | 1/1973 | Sloane et al. | 364/508 |
| 3,848,115 | 11/1974 | Sloane et al. | 364/508 |
| 4,181,028 | 1/1980 | Talbott | 73/665 |
| 4,495,560 | 1/1985 | Sugimoto et al. | 364/154 |
| 4,537,076 | 8/1985 | Lax et al. | 73/664 |

OTHER PUBLICATIONS

Papoulis; "Probability, Random Variables, and Stochastic Process"; McGraw-Hill, 1984, pp. 481–485.
"Random Vibration Test System Using Digital Equalizer" by Alfred G. Ratz; Proceedings of 1970 Annual Technical Meeting of the Institute of Environmental Sciences, Apr. 1970, pp. 75–91.

*Primary Examiner*—Parshotam S. Lall
*Assistant Examiner*—Ellis B. Ramirez
*Attorney, Agent, or Firm*—Lowe, Price, LeBlanc, Becker & Shur

[57] ABSTRACT

A vibration control system for generating desired random vibration environment with a given reference Power Spectral Density (P.S.D.) using a vibration generator on which a test object is fixed is disclosed. A detected signal representing vibration of a test object is converted into a response spectrum by Fast Fourier Transform (FFT) and the response spectrum is compared with the reference spectrum to determine a drive spectrum. Random drive signal having the determined drive spectrum amplitude is then generated continuously, and the signal is applied to a vibration generator on which the test object is fixed. This signal must be random i.e. nonperiodic, and therefore consisting of continuous spectral components with sufficient statistical independence. Method and facility to generate above mentioned signal are the principal of the present invention.

11 Claims, 9 Drawing Sheets

FIG.7B
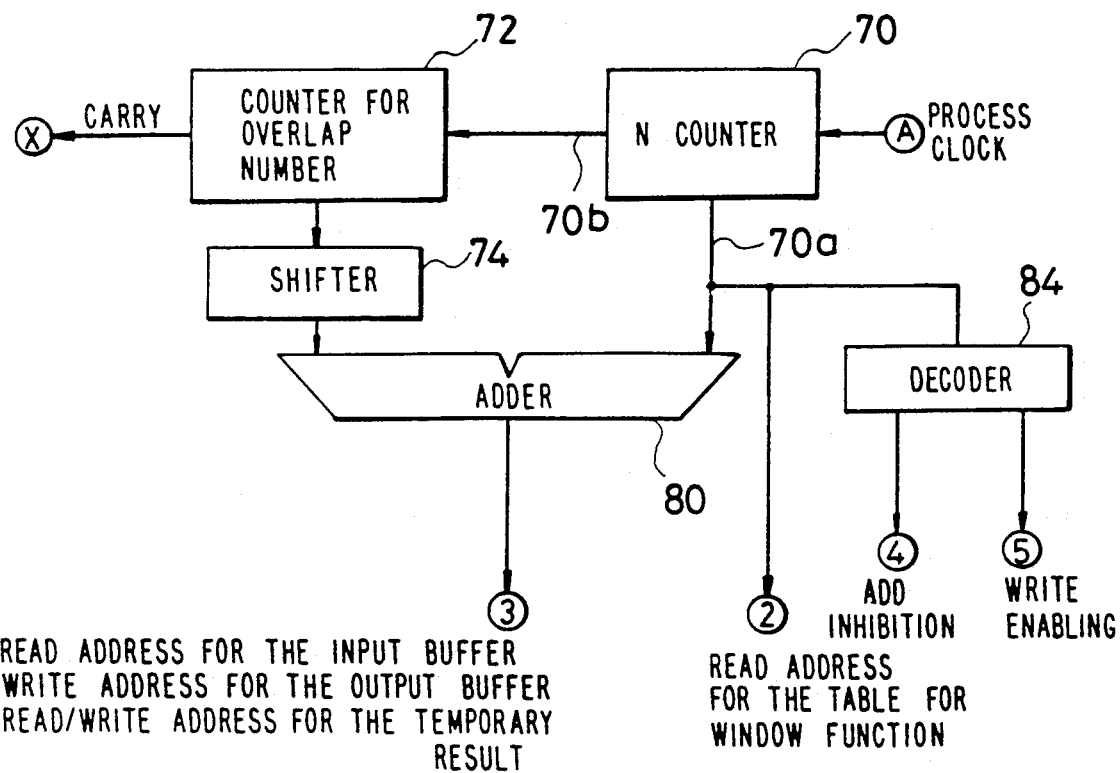
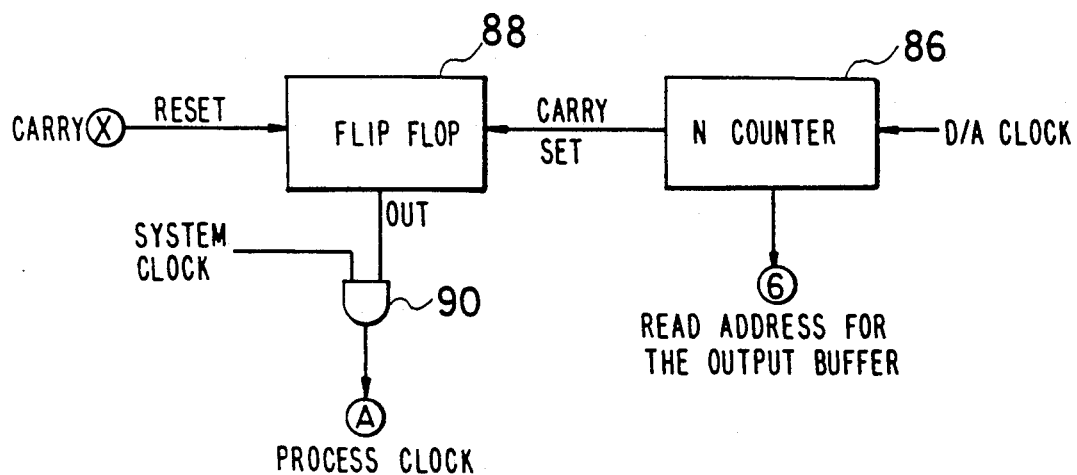

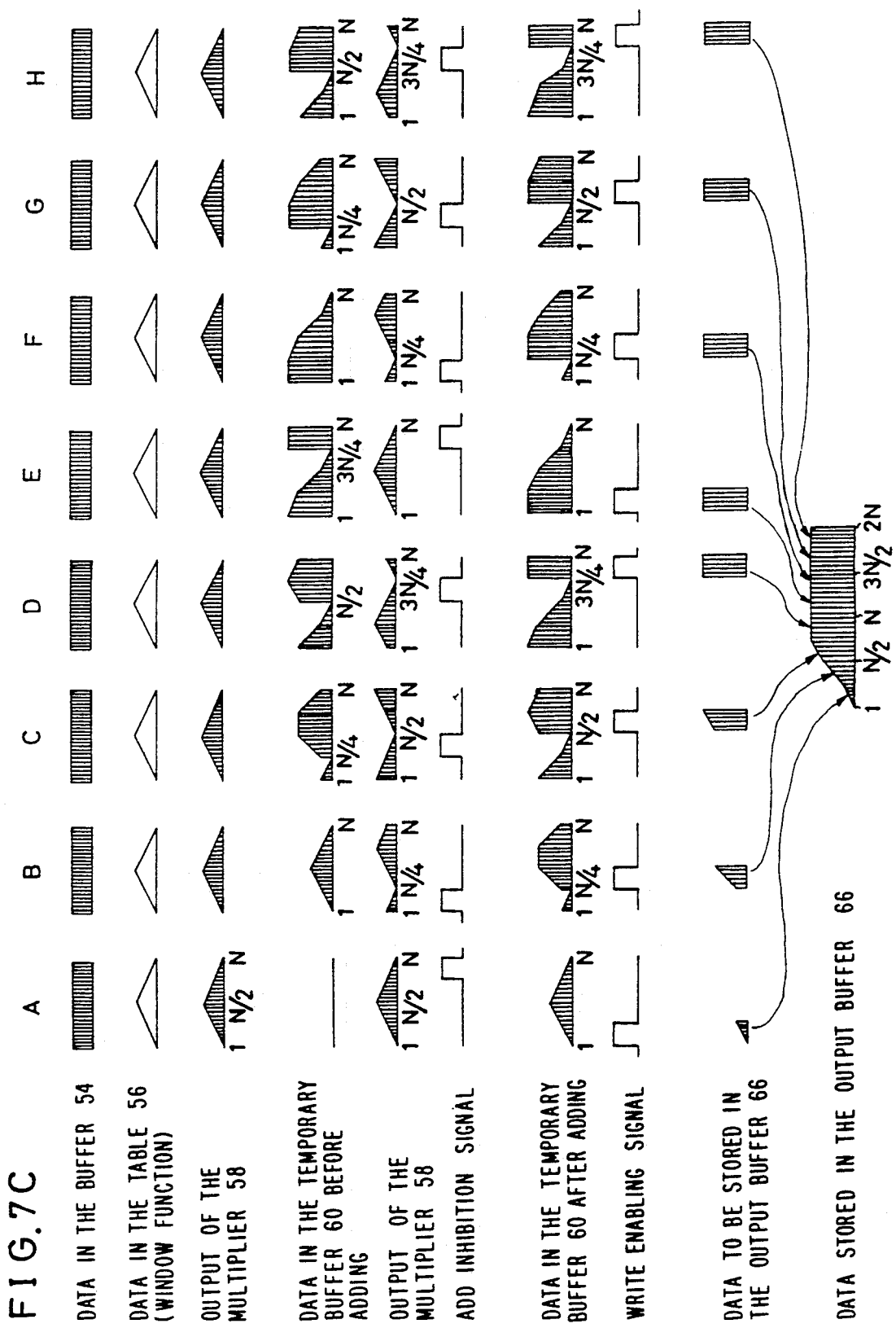

VIBRATION CONTROL SYSTEM

BACKGROUND OF THE INVENTION

1. Field of the Invention

The present invention relates to a vibration control system for simulating a vibration environment.

2. Prior Art

Mechanical vibration that an apparatus bears in transit or operation causes trouble to the apparatus. In order to examine vibration resistance ability of the apparatus, simulated vibration testing is carried out at the pilot stage and/or mass production stage of the apparatus. In vibration testing, a vibration control system controls a vibration induced on the apparatus as a test object.

The nature of vibration of the field environment is generally random and has no regularity like a sinusoid has. The simulation of such random vibration waveform itself has proved to be of very considerable difficulty. Therefore, in vibration testing, the power spectral density (P.S.D.) of the field vibration is measured and then vibration having a required power spectral density (hereinafter referred to as "reference P.S.D.") is induced on the test object.

Even when the time-domain signal having a reference P.S.D. is applied to a vibration generator, vibration having the reference P.S.D. is not induced on the test object. This is because the vibration generator has an uneven frequency response characteristic. Therefore, a drive spectrum is computed by modifying the reference P.S.D. by an uneven frequency response characteristic of the vibration generator, and a time domain signal having the determined drive spectrum is generated. Then, the time domain signal is applied to the vibration generator. Above mentioned vibration test system has been disclosed in U.S. Pat. No. 3,710,082 or "Random vibration test system using digital equalizer" by Alfred G. Ratz; Proceedings of 1970 Annual Technical Meeting of the Institute of Environmental Sciences, Apr. 1970.

In such a system, vibration of test object is detected and converted into a digital signal. This digital signal is converted into the frequency-domain by the Fourier transform and the spectrum data are averaged to estimate a response P.S.D. The response P.S.D. is compared with the reference P.S.D. and the drive spectrum is computed. The drive spectrum is converted into a time domain signal (the drive signal) by the inverse Fourier transform. The drive signal is converted into an analog signal and then is applied to the vibration generator on which the test object is fixed.

Usually a batch of digital signal data of N points (corresponding to T sec) is handled at a time in the procedure (hereinafter we call this N points of data sequence "one frame"). If the drive signal of one frame should be generated corresponding to the detected response signal of one frame, very high speed computing is necessary and the system must be expensive. Therefore, some buffering mechanism is required in the data processing procedure.

For such a purpose, U.S. Pat. No. 3,848,115 discloses a vibration control system wherein plural frames of the drive signal are obtained by a randomization process from a single frame of the time domain signal which is computed from the drive spectrum by the inverse Fourier transform. However, because the plural frames of the drive signal are generated from a single frame signal, each obtained frame of plural frames of the drive signal has not enough statistical independence.

SUMMARY OF THE INVENTION

It is an object of the present invention to provide a vibration control system in which plural frames of the drive signal are generated corresponding to a determined drive spectrum amplitude and each generated plural frames of the drive signal has enough statistical independence.

The vibration control system in accordance with the present invention comprises:

sensing means for sensing a movement of a test object;

an A/D converter for converting a detected signal from said sensing means into a digital response signal;

Fourier transform means which converts the digital response signal into a response spectrum amplitude signal and outputs the response spectrum amplitude signal;

means for generating a reference spectrum amplitude signal from a given reference power spectral density data;

computing means which calculates a drive spectrum amplitude using the response spectrum amplitude and said reference spectrum amplitude signal, and outputs a drive spectrum amplitude signal;

random phase generating means for outputting a signal representing a set of random phases;

multiplying means which calculates a drive spectrum by multiplying each components of the drive spectrum amplitude signal by the random phase factor signal from the random phase generating means;

inverse Fourier transform means which converts the drive spectrum into a time domain signal;

phase shift means for shifting the phase of the time domain signal;

windowing means for windowing the time domain signal to obtain a windowed time domain signal;

the random phase generating means, the multiplying means, the inverse Fourier transform means, the phase shift means and said windowing means including means for repeating their operation to obtain plural windowed time domain signals; and overlapping means which overlaps the plural windowed time domain signals for outputting a digital drive signal;

a D/A converter for converting the digital drive signal from the overlapping means into an analog drive signal and for outputting the analog signal to control the operation of a vibration generator.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIGS. 7A and 7B are a block diagram of the windowing means and the overlapping means of another embodiment.

FIG. 7C shows waveforms in each stage of the drive signal generator to explain the operation of the windowing means and the overlapping means shown in FIGS. 7A and 7B.

DETAILED DESCRIPTION

Figure 1:
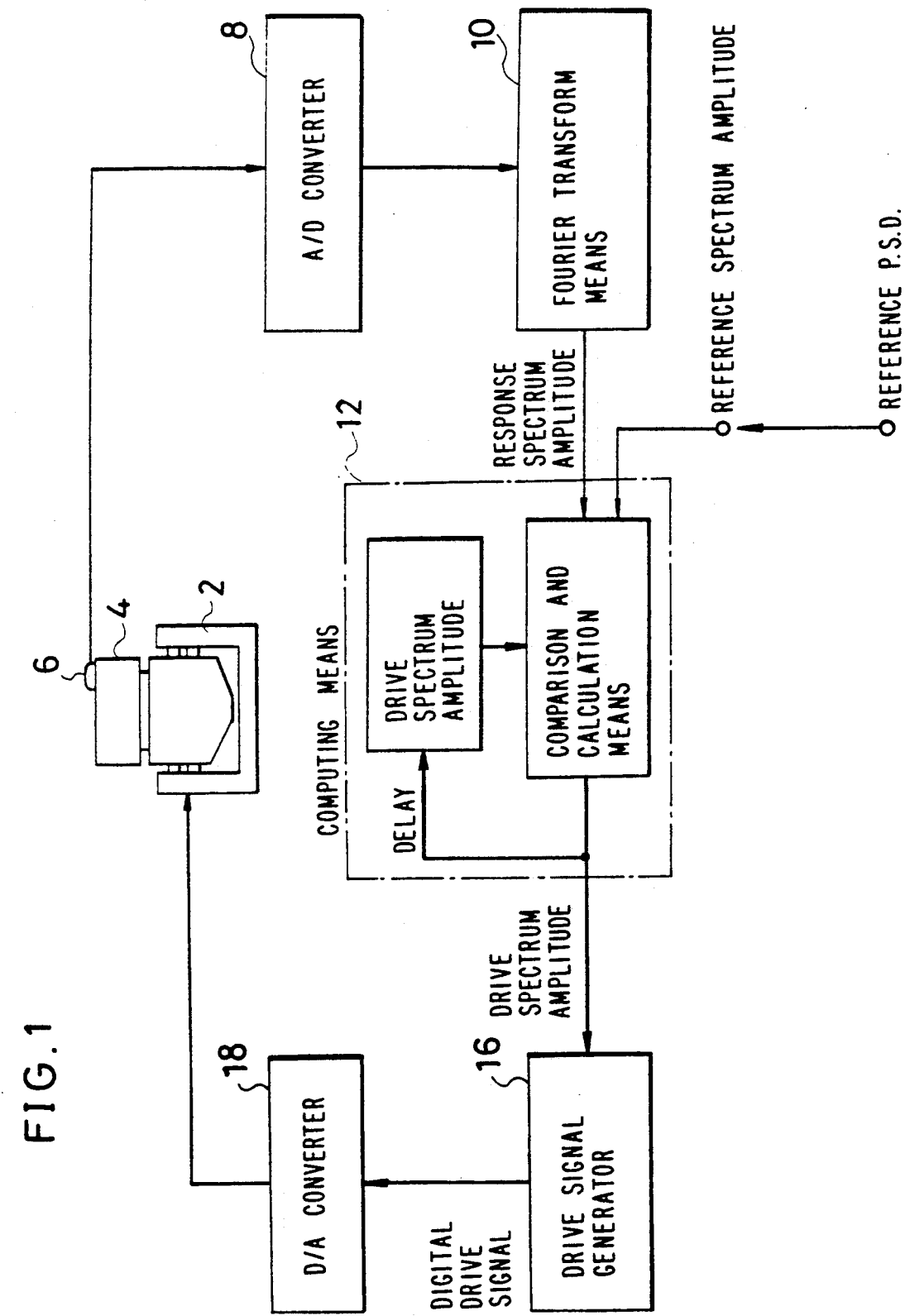
FIG. 1 is a block diagram of a vibration control system of the present invention.

FIG. 1 shows a block diagram of a vibration control system embodying the present invention. A vibration generator 2 generates mechanical vibration according to electric signal input. A test object 4 such as an apparatus is fixed on the vibration generator 2. An accelerometer 6 is fixed on the test object 4 to detect the vibration of the test object 4 and the accelerometer 6 output is applied to an A/D converter 8. The A/D converter 8, for example, an AD7572 of Analog Devices Co., converts the analog signal, a representative of the vibration of the test object 4, into a digital response signal and outputs the digital response signal to a Fourier transform means 10. The Fourier transform means 10 carries out the Fourier transform of a digital response signal and outputs an estimated response spectrum amplitude after specified averaging procedure. When the Fourier transform is carried out on a computer, the Fast Fourier Transform (FFT) technique by which high speed calculation is achieved, is used. In the FFT technique, an obtained response spectrum amplitude is a discrete spectrum consisting of L spectrum lines which are subject of control and are selected from N points data of Fourier transform. L is chosen usually as N/2.56 or N/4.096.

The response spectrum amplitude is compared with a desired reference spectrum amplitude which is predetermined by the reference P.S.D. data, and the next loop drive spectrum amplitude is calculated. An LSI-11/73 of Digital Equipment Co. can be used as the computing means 12. The computing means 12 outputs a comparison result (the next loop drive spectrum amplitude) which is a discrete spectrum and has L-spectrum lines. To each line of the drive spectrum amplitude, random phase angle factor is multiplied to yield a set of complex Fourier components. Then the inverse FFT is carried out and D/A converting is to be carried out by a D/A converter 18, for example, a DAC71 of Analog Devices Co. The obtained analog signal (analog drive signal) is applied to the vibration generator 2. By repeating the above mentioned operations, the test object 4 is exposed to a vibration having the reference P.S.D.

One problem exists at the above mentioned stage of D/A outputting the drive signal data which are given by the inverse FFT procedure, and a solution of the problem is given by the present invention.

The problem is as follows; Inverse FFT procedure outputs time series data which have discrete spectrum structure, in other words, only a composite signal of plural sinusoids with random phase angles is given by the inverse FFT procedure but not a random wave. A random wave must be nonperiodic, and therefore must be of continuous spectrum structure.

Then, some procedure must be inserted between the inverse FFT and the D/A conversion to convert the discrete spectrum into a continuous one, and which procedure must be carried out with the drive spectrum amplitude conserved. Drive signal generator 16 executes the above mentioned procedure including the inverse FFT processing. This facility has two operational mode, the True random mode and the Pseudo random mode. The former generates true random (continuous spectrum) signal and the latter generates so called pseudo random (discrete spectrum) signal.

True Random Mode

Figure 2:
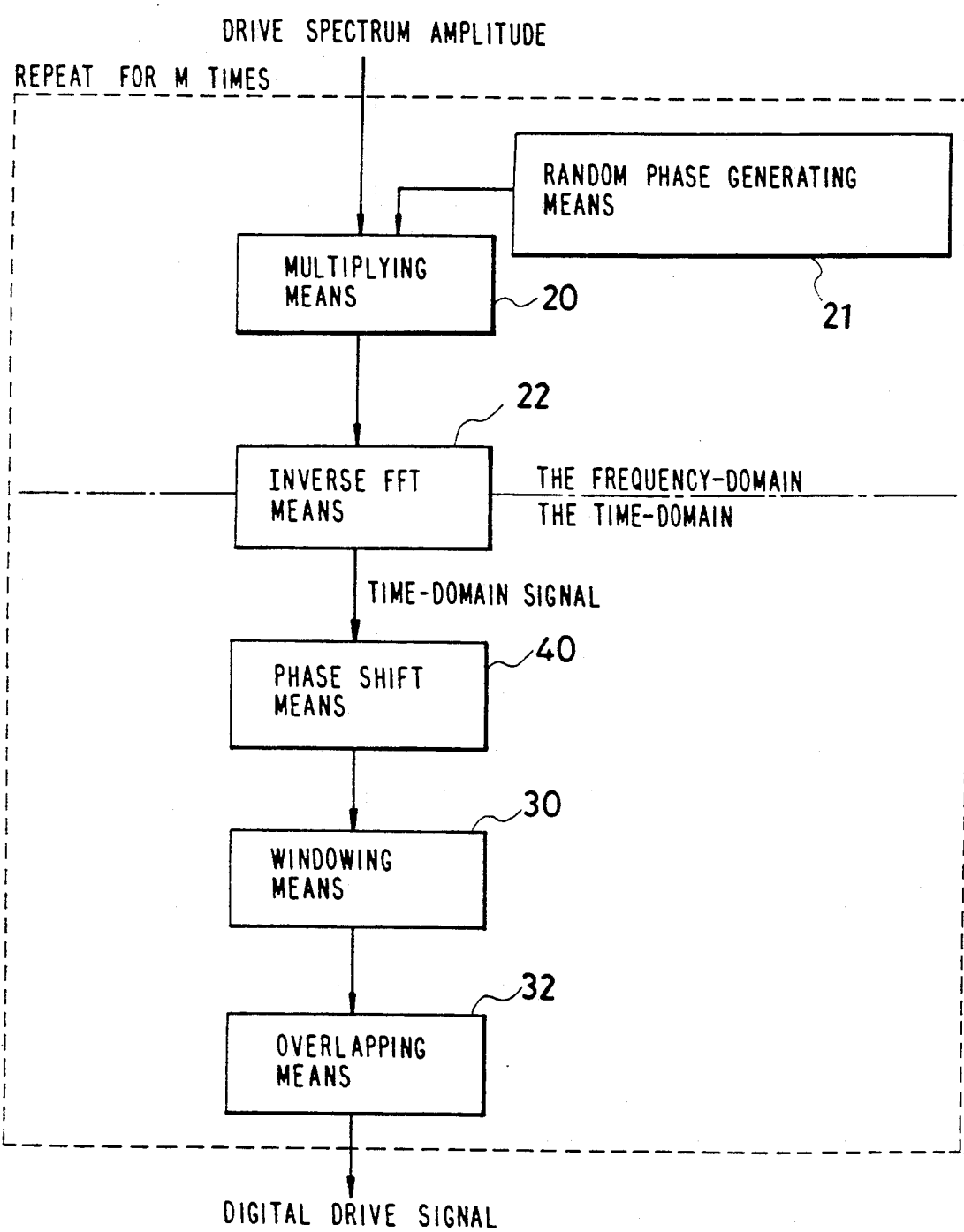
FIG. 2 is a detail block diagram of the drive signal generator 16 of FIG. 1.

FIG. 2 shows a detailed block diagram of the drive signal generator 16. The drive spectrum amplitude from the computing means 12 consists of L-number data and each data is of an absolute value without phase information. The drive spectrum amplitude data are supplied to the multiplying means 20, and a set of random phase angles $\{\theta\}$ (total L) from a random phase generating means 21 is applied to each line (each component) of the drive spectrum amplitude for obtaining a drive spectrum D ($|Di|\cos\theta i + j|Di|\sin\theta i$, where $j = \sqrt{-1}$). The drive spectrum D is converted into a time domain digital signal having one frame time length by the inverse FFT means 22. The time domain digital signal is supplied to the phase shift means 40. At first, the phase shift means 40 does not shift the phase of the digital signal and the digital signal is applied to the windowing means 30.

Figure 3:
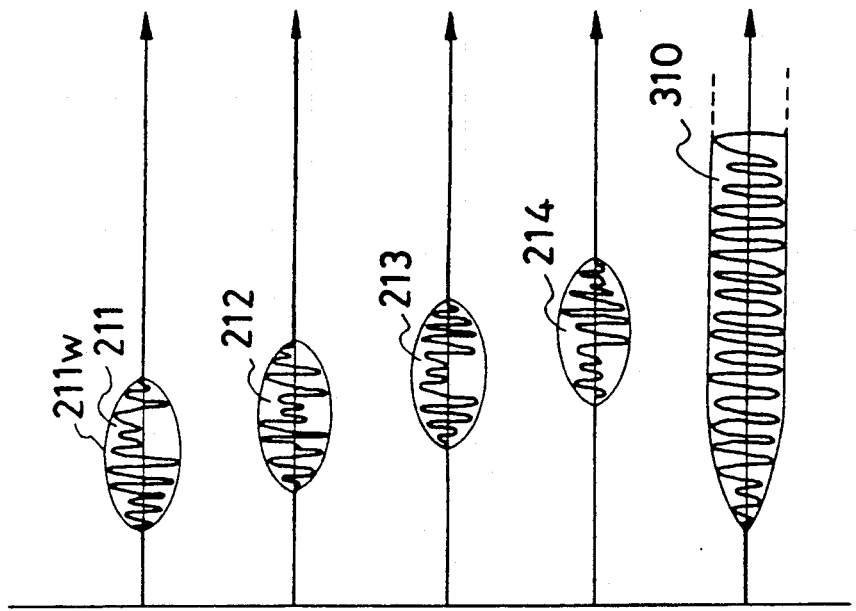
FIGS. 3 and 4 are sketches of waveform processing to explain the operation of the windowing and overlapping means.
Figure 4:
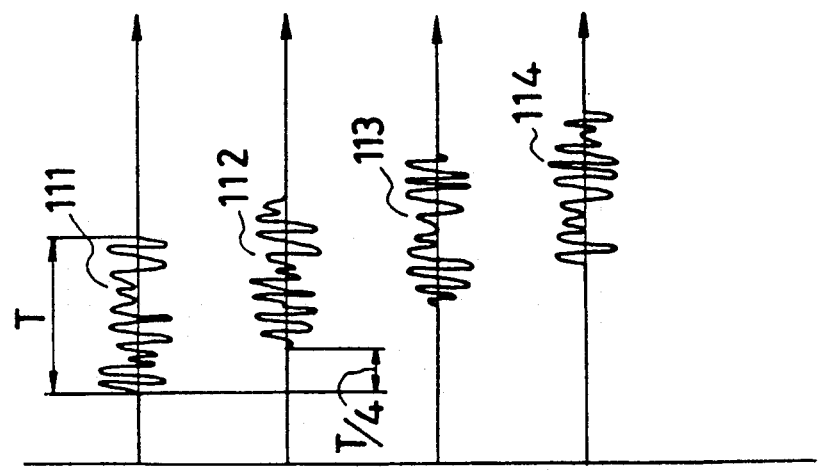

In the windowing means 30, the time domain digital signal 111 shown in FIG. 3 is converted into the windowed digital signal 211 shown in FIG. 4. In FIG. 4, 211W shows the shape of the window function. In FIGS. 3 and 4, the signal is shown as an analog signal for clear understanding. The windowed signal is applied to an overlapping means 32.

Next, the same drive spectrum amplitude as above is applied to the multiplying means 20. The random phase generating means 21 generates another set of random phase angles $\{\theta\}$ different from that generated the last time. In the multiplying means 20, the random phase angle $\theta_i$ is applied to each line of the drive spectrum amplitude for obtaining another drive spectrum D. The drive spectrum D is converted into a time domain digital signal by the inverse FFT means 22. The time domain signal in turn is applied to the phase shift means 40.

The phase shift means 40 shifts linearly the phase of the time domain signal with T/M, where T is a frame time and M is the number of overlapping times. Because, in this embodiment, the overlap number M is 4, the linear phase shift of T/4 is carried out as shown by 112 of FIG. 3.

The shifted signal 112 is converted into the windowed signal 212 (see FIG. 4) by the windowing means 30. In the overlapping means 32, the windowed signal 212 is superposed on the windowed signal 211.

The above mentioned operation is repeated for M times and the digital drive signal 310 shown in FIG. 4 is obtained.

In such a procedure, a nonperiodic random signal is generated continuously from plural frames of composite sinusoidal signal fragments which are generated by the inverse FFT procedure.

From the viewpoint of statistical independence, each frame of above contains L random phase angles $\{\theta\}$ which are uniformly distributed in the range of $0 \leq \theta < 2\pi$, and these sets of angles $\{\theta\}$ are independent each other frame by frame. As one frame length of output random signal is composed of such M frames of input signal, total LM random numbers (L=100-1000, M=4-16, typically) are used per one frame output.

In a prior art, the same input signal is used to generate an output signal, and the randomness is induced by shifting the input data by a random number sequence $\{\tau\}$ for M times per one output frame. How many different versions of output signal frames can be made by this method? In case of N=256, M=2, about 65,000 different versions are possible. This means that the output signal of this method has a period of maximum 65,000 frames length. In this sense, this signal is a periodic signal but not a random signal. All that we can make are finite, but the method of the present invention gives a very long period: In the same case of above, that is N=256, M=2 and L=100, the number of different versions of output signal is estimated as an order of $10^{231}$(231-th power of 10). Nobody will find a periodic structure in this signal, so there is a reasonable basis of calling this signal "random".

One more important problem is a spectrum change that is induced on the signal through this processing. No other change than "discrete to continuous" is desirable. For this purpose an windowing technique is used as explained above. When a composite signal of plural sinusoids is windowed, its discrete spectrum is convoluted in the frequency-domain with the spectrum of the window function which has a continuous structure causing it's finite length non-zero portion shape in the time-domain (like a pulse). In consequence, each spectral line of the original signal is spread out according to the shape of the Fourier transform of the window function. Therefore, the spectrum change induced through the processing is controllable, and a selection of favorable window leads us to a good result. Selection of window function of usage has another aspect, and it will be stated later.

Figure 5:
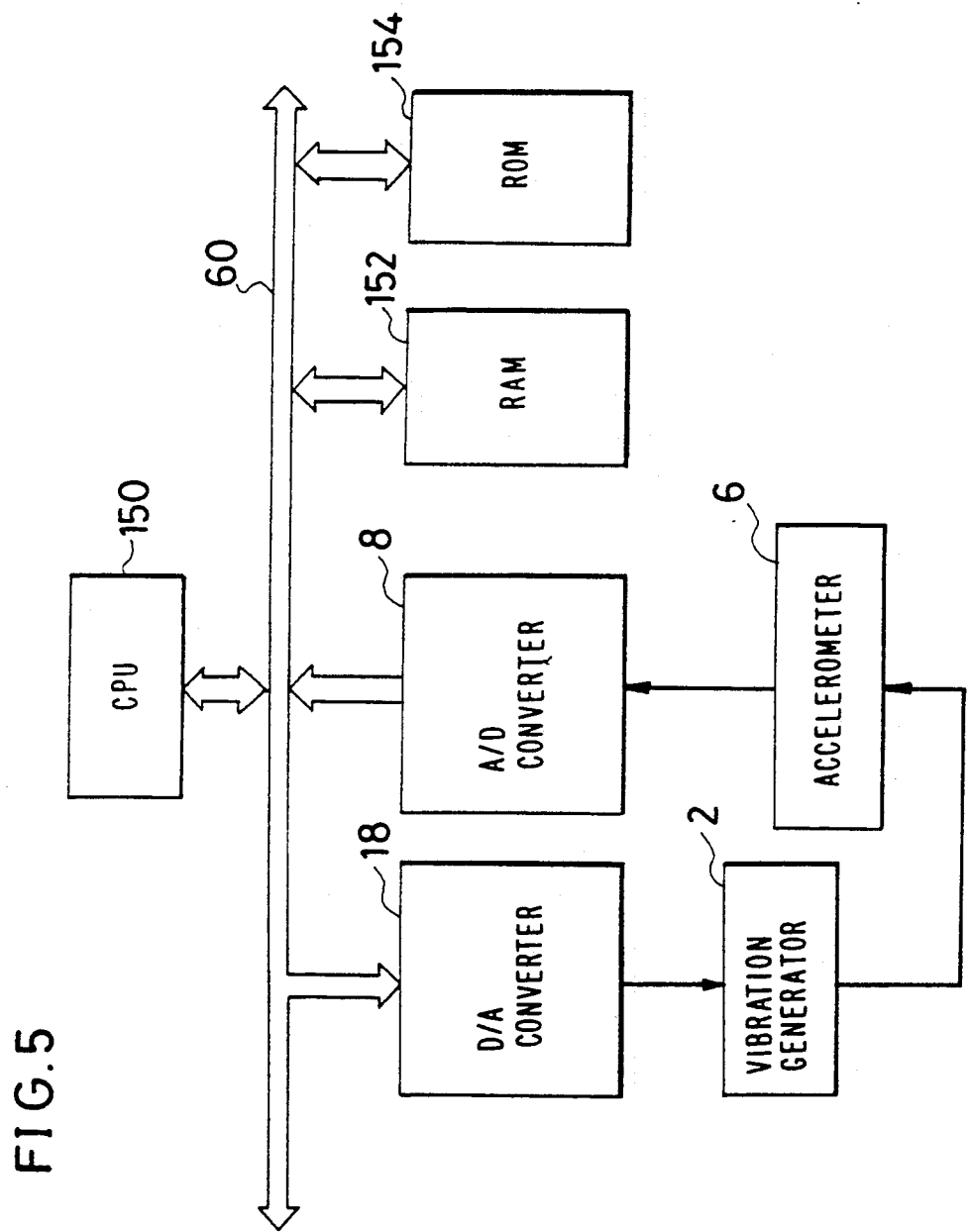
FIG. 5 is a block diagram for showing a basic hardware implementation of the vibration control system using a microprocessor.

FIG. 5 shows an embodiment of the multiplying means 20, the random phase generating means 21, the inverse FFT means 22, the phase shift means 40, the windowing means 30 and the overlapping means 32 by using a microprocessor. In this embodiment, a single CPU 150 carries above mentioned calculations.

Figure 6:
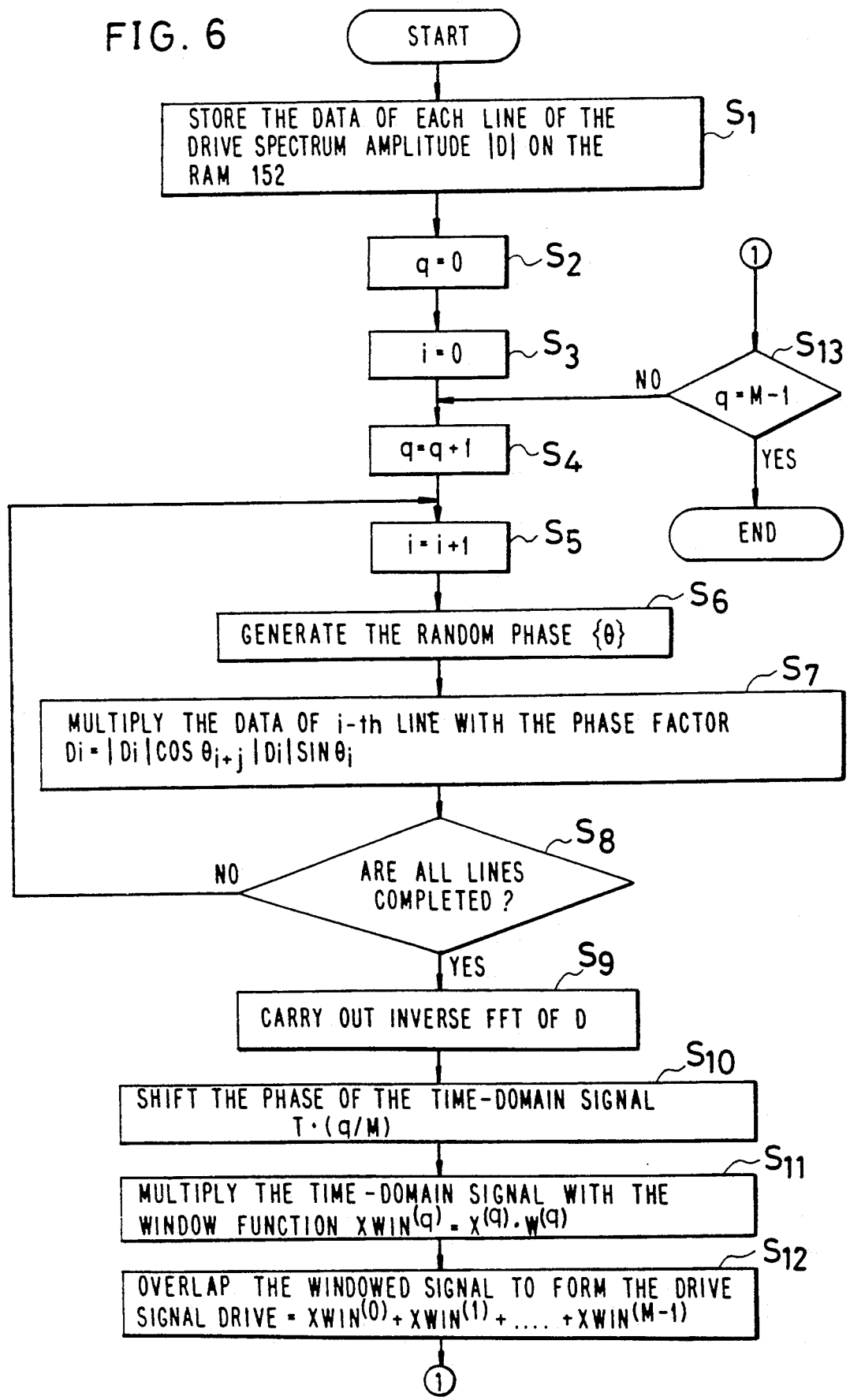
FIG. 6 is a flow chart of a program stored in the ROM 154 shown in FIG. 5.

In ROM 154, a program shown by the flow-chart in FIG. 6 is stored. In the flow-chart, a step $S_6$ corresponds to the random phase generating means 21, a step $S_7$ corresponds to the multiplying means 20, a step $S_9$ corresponds to the inverse FFT means 22, a step $S_{10}$ corresponds to the phase shift means 40, a step $S_{11}$ corresponds to the windowing means 30 and a step $S_{12}$ corresponds to the overlapping means 32.

When an attached processor, for example TMC320C25 of Texas Instruments Co., is provided before the D/A converter 18 for inverse FFT calculation and multiplication, faster operation can be achieved. In this case, the phase shift means 40, the windowing means 30 and the overlapping means 32 may be a logic circuit.

Figure 7A:
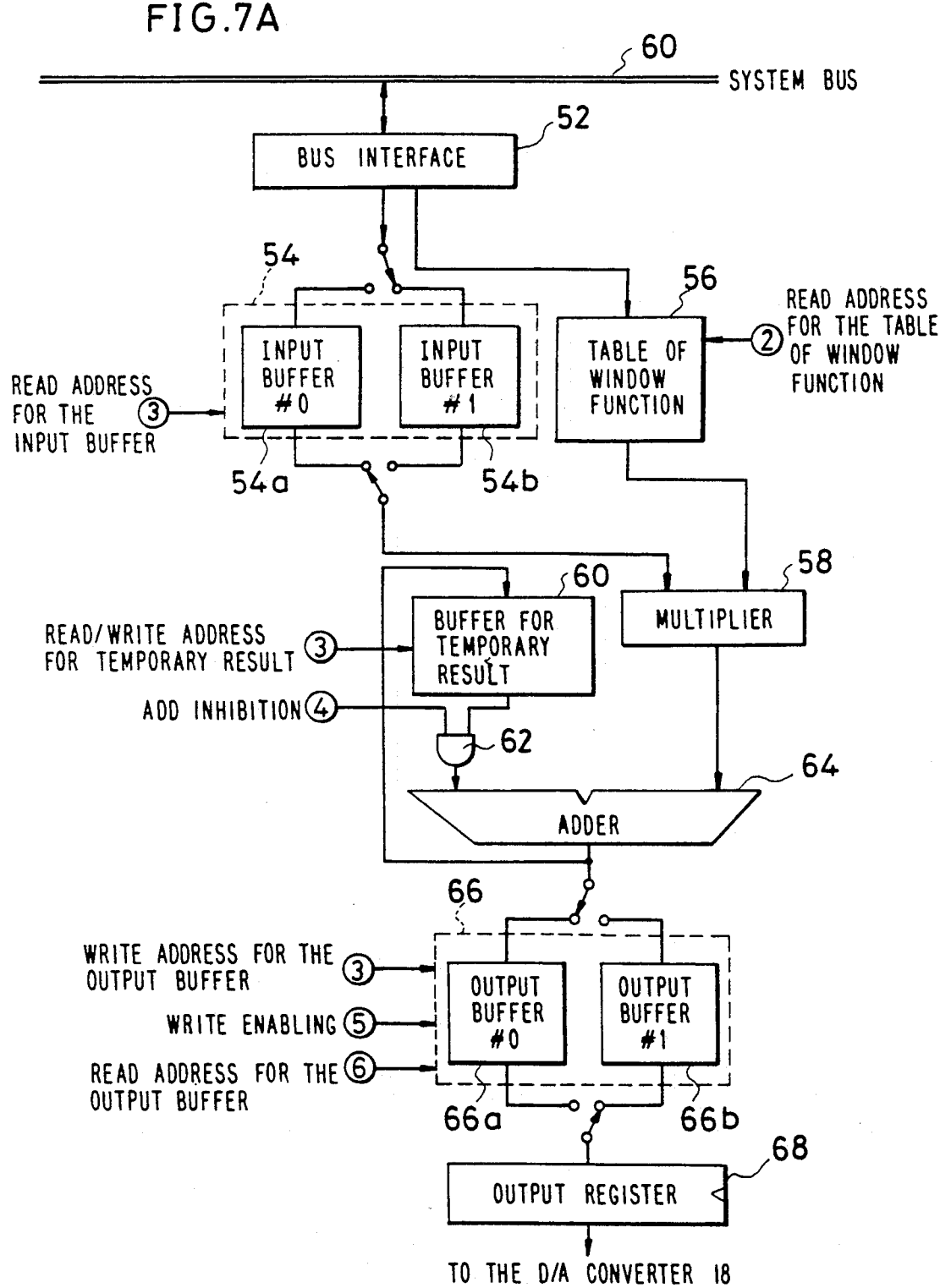

FIG. 7A shows a block diagram of the phase shift means 40, the windowing means 30 and the overlapping means 32 in the above case. Through the system bus 60, the time-domain digital signal data of one frame length is sent from the processor (not shown) which is for the inverse FFT calculation and the multiplication. The time-domain signal is stored in input buffer 54 through a bus interface 52. In this embodiment, one frame corresponds to N words.

The stored time domain data (see A of FIG. 7C) in the buffer 54 are read out according to the read address signal ③ which is an output from circuit shown in FIG. 7B. In FIG. 7B, an N counter 70 counts process clock A pulses and outputs a carry signal each N count. A counter 72 for overlap counting counts the carry signal for outputting the overlap count q to a shifter 74 (q=0, 1, 2, ..., M−1, 0, 1, 2 ...). The shifter 74 carries out the shift operation of the input data (q) according to the overlap number M. When $N=2^n$ and $M=2^m$, the shifter 74 carries out a left shift operation of n-m bits of the data q. The output of the shifter 74 is applied to an input terminal of an adder 80. Counting output 70a of the N counter 70 is applied to an another input terminal of the adder 80. Therefore, the adder 80 outputs the read address signal ③ for the input buffer 54 in accordance with following equation;

$$Add = (N/M)q + i$$

where i is the counting output of the N counter 70.

When at first the overlap count q is 0, the output read address becomes to equal to the output of the N counter 70.

On the other hand, in FIG. 7A, a window function Table 56 stores window function values (see A of FIG. 7C) each of which is provided for each word of the time-domain signal. The window function values are read according to read address signal ②. The output of the input buffer 54 and the output of the table 56 are multiplied in each word, serially, by a multiplier 58. In other words, the multiplier 58 carries out the windowing operation (see A of FIG. 7C). The output data of the multiplier 58 are applied to the adder 64, serially in words, and these data are stored temporarily in a buffer 60 (see A of FIG. 7C). The output of the adder 64 is stored in output buffer 66 in a condition of a high state of a write enabling signal ⑤ (see A of FIG. 7C). The write enabling signal ⑤ is obtained by decoding the counting output 70a of the N counter 70 by a decoder 84. The decoder 84 outputs the high signal, when the output 70a of the N counter 70 is between 1 to N/4.

Next, a new time domain digital signal of one frame length is sent from the processor through the system bus 60 (see B of FIG. 7C). At this time, the counter 72 for overlap counting counts up by the carry from the N counter 70 and outputs the overlap count of 1. The read address ③ for the input buffer 54 is shifted by N/4 from the read address for the table 56 of window function values. Therefore, the output of the multiplier 58 is as shown in B of FIG. 7C. The adder 64 adds the data temporarily stored in buffer 60 with the output of the multiplier 58. The output of the adder 54 shown as B of FIG. 7C is stored in the output buffer 66 when the write enabling signal is high as shown in B of FIG. 7C (notice an N/4 shift between the read address ③ and the counting output 70a of the N counter 70).

Similar operation is repeated as shown in C, D, E, F, G and H of FIG. 7C and an overlapped time domain digital signal thus developed is applied to the output buffer 66. In FIG. 7C, the window function is shown by a triangle waveform and the envelope of the time domain signal from the system bus 60 is shown by a flat waveform for clear understanding.

Window function used for windowing operation

It is necessary to study what kind of window function is suitable. When suitable window function is not used, an undesirable component is induced at the overlapping procedure of each frame. For example, if a flat waveform (DC) is applied to the system having an undesirable window function, the output after windowing and overlapping has a ripple.

In this embodiment, the following window function w(t) is used:

$$w(t) \begin{cases} = a_0 + \sum_{k=1}^{R} (a_k\cos\omega_k t + b_k\sin\omega_k t), & 0 \leq t \leq T \\ = 0, & \text{elsewhere} \end{cases} \quad (1)$$

where:
T denotes the time length of one frame,
t denotes time,
$\omega_1 = 2\pi/T$ and
$\omega_k = \omega_1 \cdot k$, $k = 1, 2, 3, \ldots R$ Further, the window function satisfies the following condition I:

that $a_k$, $b_k$ is substantially zero when $k = nM$ (condition I), where n is natural number, and M is total overlap number (4 in this embodiment).

By using the window function satisfying the condition I, undesirable component is not generated at the overlaps after windowing. The reason is as follows:

If we denote the q-th overlap window as $w^{(q)}(t)$, the windowed signal is expressed as $w^{(q)}(t)x(t)$ where x(t) denotes an input signal. Now we give the same input signal x(t) to the each windowing operation, the output signal which is an overlapped sum of the windowed signals is expressed as $$\sum_{q=0}^{M-1} w^{(q)}(t)x(t).$$

We require the output signal to be equal to the input signal in this situation (corresponds to the pseudo random mode). This requirement is satisfied when $$\sum_{q=0}^{M-1} W^{(q)}(t) = 1 \quad (2)$$

In other words, to generate no undesirable component means that addition (overlap result) of components of the window function ($a_1$-$a_R$, $b_1$-$b_R$) becomes zero except for DC components ($a_0$).

A phase rotation $\theta_k^{(q)}$ of the k-th harmonic component of q-th overlap count window $w^{(q)}(t)$ which is a shifted version of w(t) is $$\theta_k^{(q)} = \frac{2\pi}{M} kq \quad (3)$$

where,
$k = 1, 2, 3, \ldots R$,
$q = 0, 1, 2, \ldots (M-1)$.

Hereinafter, only the cosine component of w(t) is described for simplification.

Sum of each k-th component $y_k^{(q)}$ of the overlap count windows $w^{(q)}(t)$ is $$\begin{aligned} y_k(t) &= \sum_{q=0}^{M-1} y_k^{(q)} \\ &= \sum_{q=0}^{M-1} a_k\cos(\omega_k t - (2\pi/M)kq). \end{aligned} \quad (4)$$

In the complex number expression, equation (4) is represented as follows:

$$\begin{aligned} y_k(t) &= \text{Re}\left\{ \sum_{q=0}^{M-1} a_k e^{j(\omega_k t - (2\pi/M)kq)} \right\} \\ &= \text{Re}\left\{ a_k e^{j\omega_k t} \sum_{q=0}^{M-1} e^{-j(2\pi/M)kq} \right\}. \end{aligned} \quad (5)$$

Therefore, the requirement reduced to be:

$$\sum_{q=0}^{M-1} e^{j(2\pi/M)kq} = 0. \quad (6)$$

Now, $e^{j(2\pi/M)q}$ is a M-th roots of unity. So, if the cases satisfying following condition are excepted, equation (6) is valid.

$$(2\pi/M)k = 2\pi n \quad (7).$$

Therefore, $y_k(t)$ becomes zero with an excepting condition of $k = nM$, where n is a natural number.

Concerning the sine components of w(t), the same result is obtained. Therefore, the sum of the Fourier components of $w^{(q)}(t)$, except $a_0$, becomes zero in cases other than $k = nM$. In other words, an undesirable component is not generated by using the window function which does not include the harmonics of natural number (1, 2, 3 . . . ) multiple of the overlap number M.

The window functions w(t) satisfying the above mentioned condition I in overlap number being 4 are, for example, $$w(t) = a_0 + \sum_{k=1}^{R} (a_k\cos\omega_k t)$$

(i) Hanning window
   $a_0 = 0.5$, $a_1 = 0.5$ (R = 1)
(ii) Blackman window
   $a_0 = 0.42$, $a_1 = 0.5$, $a_2 = 0.08$ (R = 2)
(iii) Blackman-Harris window
   $a_0 = 0.35875$, $a_1 = 0.48829$, $a_2 = 0.14128$, $a_3 = 0.01168$ (R = 3)
(iv) Nuttall window
   $a_0 = 0.3635819$, $a_1 = 0.4891775$, $a_2 = 0.1365995$, $a_3 = 0.0106411$ (R = 3).

These window functions do not contain 4-th harmonics.

Further, we consider a condition of window function for minimizing the output signal variance within one frame. For this purpose, overlapping sum of squares of each overlap count window function value must be constant.

$$\sum_{q=0}^{M-1} (W^{(q)}(t))^2 = \text{const} \quad (8)$$

When equation (8) is differentiated, $$\sum_{q=0}^{M-1} w^{(q)}(t) \frac{dw^{(q)}(t)}{dt} = 0. \quad (9)$$

We assume the form of equation (1) for the window function. Therefore, by using $\theta_k^{(q)}$ of the equation (3), q-th overlap count window is expressed as below:

$$w^{(q)}(t) = a_0 + \sum_{k=1}^{R} \{a_k \cos(\omega_k t - \theta_k^{(q)}) + b_k \sin(\omega_k t - \theta_k^{(q)})\}. \quad (10)$$

For facility, only the cosine components are considered.

$$w^{(q)}(t) = Re\left\{\sum_{k=1}^{R} a_k e^{j(\omega_k t - \theta_k^{(q)})}\right\} \quad (11)$$

When the equation (11) applied to the equation (9), $$\sum_{q=0}^{M-1} \left(\sum_{k=1}^{R} a_k e^{j(\omega_k t - \theta_k^{(q)})}\right) \cdot \quad (12)$$

$$\left\{j \sum_{k'=1}^{R} a_{k'} \omega_{k'} \cdot e^{j(\omega_{k'} t - \theta_{k'}^{(q)})}\right\} = 0.$$

By changing the summation order, $$\sum_{k} \sum_{k'} a_k a_{k'} \omega_{k'} e^{j(\omega_k + \omega_{k'})t} \cdot \sum_{q} e^{-j(\theta_k^{(q)} + \theta_{k'}^{(q)})} = 0. \quad (13)$$

Therefore, if the following equation stands, requirement (9) is satisfied;

$$\sum_{q=0}^{M-1} e^{-j(\theta_k^{(q)} + \theta_{k'}^{(q)})} = 0. \quad (14)$$

By rewriting the equation (13) by using the equation (3), $$\sum_{q=0}^{M-1} e^{-j\frac{2\pi}{M}q(k+k')} = 0. \quad (15)$$

For satisfying the equation (15), $(k+k')$ shown below are not to be included.

$$\frac{2\pi}{M}(k + k') = 2\pi n \quad (16)$$
$$n = 1, 2, 3 \ldots$$

so, $$(k + k') = nM \quad (17)$$
$$n = 1, 2, 3 \ldots$$

Because k and k' are natural numbers less than or equal to R (=maximum harmonics number), the value of the left side of the equation (17) is not over 2R. Therefore, examining the minimum value of the right hand side of (17), we obtain the following condition II:

$$R < M/2 \quad \text{(condition II)}.$$

When condition II is satisfied, condition I is automatically satisfied.

Finally, the window function satisfying the condition II is suitable.

The table below shows the ranges in which $a_k$ may not be zero, in connection with M.

TABLE

| | M ≧ 4 | M ≧ 6 | M ≧ 8 | M ≧ 10 | M ≧ 12 | M ≧ 14 | M ≧ 16 |
|---|---|---|---|---|---|---|---|
| $a_0$ | | | | | | | |
| $a_1$ | | | | | | | |
| $a_2$ | | | | | | | |
| $a_3$ | | | | | | | |
| $a_4$ | | | | | | | |
| $a_5$ | | | | | | | |
| $a_6$ | | | | | | | |
| $a_7$ | | | | | | | |

For using the Hanning window ($a_0 = 0.5$, $a_1 = 0.5$, (R=1)), M should not be less than 4. For using the window having the third harmonics (R=3), M should not be less than 8.

Pseudo Random Mode

In the pseudo random mode, the random phase generating means 21 generates the same data of random phases in each repeat operation, while in the true random mode, it generates different random phases in each repeat operation. When the same data of random phases are supplied in each repeat operation, the multiplying means 20 outputs the same drive spectrum data D, so the inverse FFT means 22 outputs the same drive signal waveform which has a discrete spectrum repeatedly.

When the window function satisfying the condition I is used, the input waveform passes through the windowing means and the overlapping means without deforming as if these means are transparent for the waveform itself. Consequently, the drive signal generator 16 behaves as a pseudo random signal generator in this case. Therefore, the pseudo random mode and the true random mode can be selected based upon whether the random phases are the same in each repeat operation or not.

Further, by satisfying following relation, the r.m.s. value of output signal in the true random mode is equal to that in the pseudo random mode.

$$\frac{\text{Window function value in the true random mode}}{\text{Window function value in the pseudo random mode}} = \sqrt{M/B} \quad (A)$$

where B is the Equivalent Noise Band Width of a window function.

This reason is as follows:

First, gain ($Gain^P$) of windowing operation in the pseudo random mode is studied. Peak gain PG of a single window is $$PG = \sum_{i=1}^{N} w(i)/N. \quad (18)$$

where N is number of words of window length. When the total overlap number is M, total M windows contribute the output per each frame. Therefore the operation gain ($Gain^P$) is $$Gain^P = PG \cdot M \quad (19).$$

By using the below calibration value $Cal^P$, the output signal level is equal to the input signal level; the requirement is $$Gain^P \cdot Cal^P = 1 \quad (20)$$

so, $$Cal^P = 1/(PG \cdot M) \quad (21).$$

Therefore, it is suitable for unchanging between input and output signal levels to use calibrated window function $w^P(i)$.

$$w^P(i) = w(i) \cdot Cal^P \quad (22)$$

Next, operation gain $Gain^T$ in the true random mode is studied. At first, r.m.s. gain of a single window is studied. If the window calibrated by the relation (18), that is, peak-caliblated window $$w'(i) = w(i)/PG \quad (23)$$

is used, r.m.s. value is overestimated by the factor $\sqrt{B}$.

$$rms' = rms \cdot \sqrt{B} \quad (24)$$

where rms' denotes the estimated value and rms denotes the true value. B denotes the Equivalent Noise Band Width of the window;

$$B = \left( \sum_{i=1}^{N} w^2(i)/N \right) / \left( \sum_{i=1}^{N} w(i)/N \right)^2. \quad (25)$$

By equations (21) and (22), $$w^P(i) = w'(i)/M. \quad (26)$$

Therefore, if a signal having a value rms is carried out windowing operation by using a single window $w^P(i)$ which is calibrated for the pseudo random mode, the r.m.s. value $rms^P$ of the output signal of this operation becomes as below.

$$rms^P = rms'/M = (\sqrt{B/M}) \cdot rms \quad (27).$$

Above contributions from each single window construct the total output signal r.m.s. Because each output $rms^P(j)$ of windows is statistically independent from each other, r.m.s. value RMS of sum of outputs of M windows is $$RMS^2 = \sum_{q=0}^{M} (rms^P(q))^2. \quad (28)$$

On the other hand, the following relation between average r.m.s. value can be assumed.

$$rms^P(0) = rms^P(1) = \ldots = rms^P(M-1) \equiv rms^P \quad (29)$$

When the equation (29) is applied to the equation (28), $$RMS = rms^P \cdot \sqrt{M} \quad (30).$$

By substituting the equation (27) into the equation (30),
$$RMS = \sqrt{B/M} \cdot rms \quad (31).$$

In conclusion, from equation (31), if the window $w^P(i)$ which is calibrated for the pseudo random mode is used for the true random mode operation, the processing gain of this operation is not unity but $\sqrt{B/M}$. Therefore, by satisfying the equation (A), the output signal level in the true random mode is equal to that in the pseudo random mode.

For fast changing of the two modes, it is suitable to provide a table of window function values for the true random mode and a table of window function values for the pseudo random mode.

In this embodiment, the system can be operated as follows:

(i) First, the drive signal generator is set into the pseudo random mode, and a pseudo random signal having a flat spectrum is applied to the vibration generator 2 for obtaining a transfer characteristic of the system (the vibration generator 2 and the test object 4) to be controlled. Because the averaging operation is not necessary in the pseudo random mode, the transfer characteristic is quickly obtained.

(ii) Then, the drive spectrum amplitude is calculated by the transfer characteristic and the desired reference spectrum amplitude.

(iii) Next, when the response spectrum amplitude is within predetermined allowance range of the reference spectrum amplitude, the drive signal generator is turned into the true random mode. At this mode change, the output signal is continuously applied to the vibration generator.

It is suitable for security of the device that the response spectrum amplitude induced by the drive spectrum amplitude in (ii) is less than the reference spectrum amplitude by 10 dB.

To change to the pseudo random mode is also suitable for adapting rapid change of the reference spectrum amplitude itself.

Phase Shift and Windowing in the Frequency Domain

Figure 8:
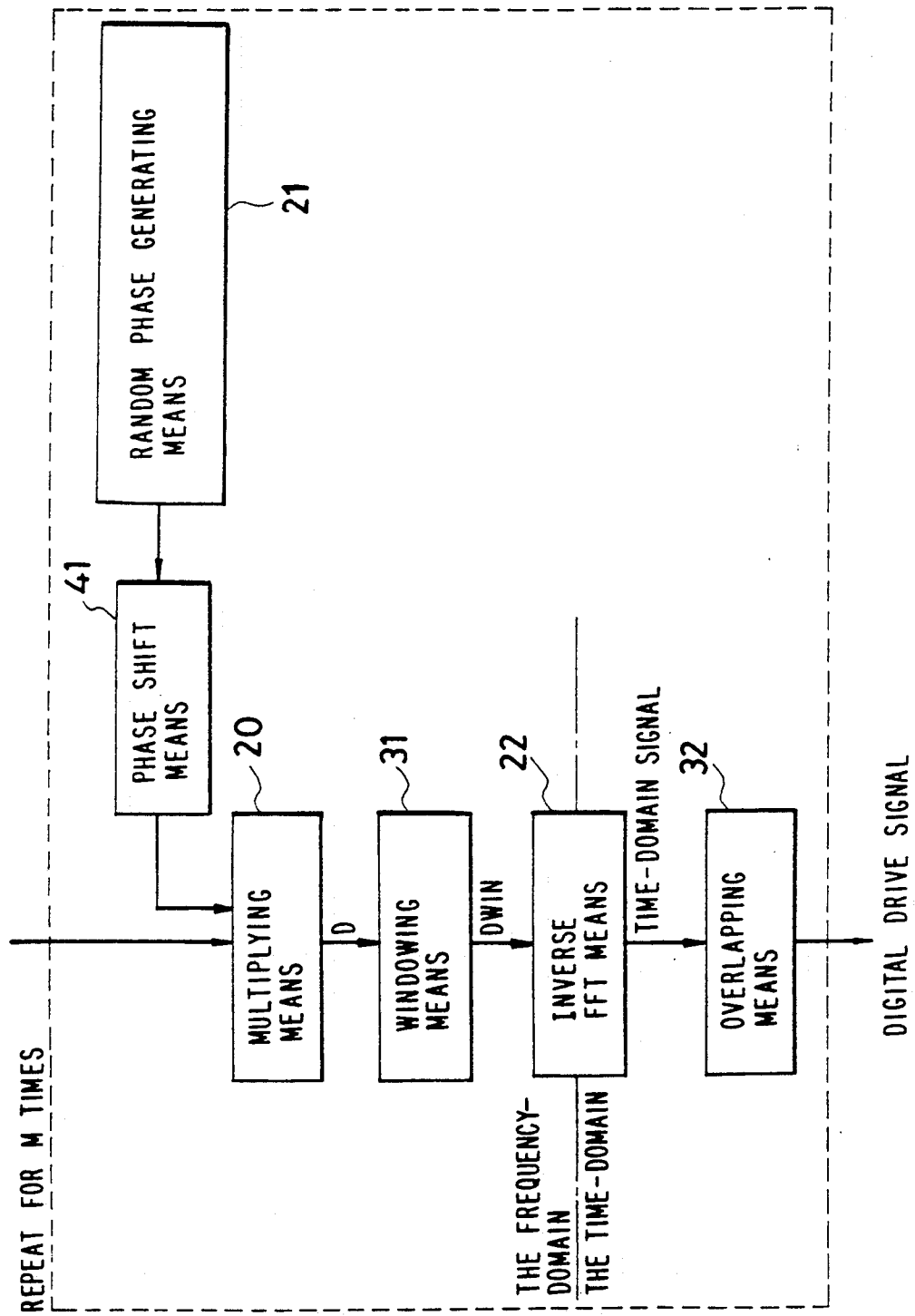
FIG. 8 is a detailed block diagram of the drive signal generator in other embodiment.

As shown in FIG. 8, the phase shift and windowing operation may be carried out in the frequency-domain. In this case, the following relation is utilized:

$$x(t-t_0) \longleftrightarrow e^{-j2\pi f t_0} X(f) \quad (32)$$

where symbol "$\longleftrightarrow$" denotes a Fourier transform pair and $t_0$ is a liner phase shift value. (32) stands on the assumption $$x(t) \longleftrightarrow X(f) \tag{33}$$

Therefore, by the relation (32), instead of $$D = |D|e^{j\theta},$$

operation below $$D = |D|e^{j\theta} \cdot e^{-j2\pi f t_0} = |D|e^{j(\theta - 2\pi f t_0)} \tag{34}$$

can be carried out for phase shifting in the frequency-domain. A phase shift means 41 carries out the operation shown in equation (34).

For the windowing operation, the following characteristic is utilized:

$$x_1(t) \cdot x_2(t) \longleftrightarrow X_1(f) * X_2(f) \tag{35}$$

where $X_1(f)$ is the Fourier transform of $x_1(t)$, $X_2(f)$ is the Fourier transform of $x_2(t)$ and "*" denotes a convolution calculation. Therefore, instead of $w(t) \cdot x(t)$, $$W(f) * X(f) \tag{36}$$

can be carried out for windowing in the frequency-domain. A windowing means 31 carries out the operation shown in (35).

The convolution calculation is more complex than the multiplication in general. The convolution calculation is suitable in case of a few coefficients of $W(f)$, such as in the Hanning window.

As has been described in detail for various embodiments, the vibration control system in accordance with the present invention has a drive signal with enough statistically independence, as a result of generating each frame of the signal input to phase shift means 40 by a different drive spectrum which is obtained from the same drive spectrum amplitude.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. Vibration control system, comprising:
   sensing means for sensing a movement of a test object;
   an A/D converter for converting a detected signal from said sensing means into a digital response signal;
   Fourier transform means which converts the digital response signal into a response spectrum amplitude signal and outputs the response spectrum amplitude signal;
   means for generating a reference spectrum amplitude signal from a given reference power spectral density data;
   computing means which calculate a drive spectrum amplitude using the response spectrum amplitude and said reference spectrum amplitude signal, and outputs a drive spectrum amplitude signal;
   random phase generating means for outputting a signal representing a set of random phases;
   multiplying means which calculates a drive spectrum by multiplying components of the drive spectrum amplitude signal by the random phase factor signal from the random phase generating means;
   inverse Fourier transform means which converts the drive spectrum into a time domain signal;
   phase shift means for shifting the phase of the time domain signal;
   windowing means for windowing the time domain signal to obtain a windowed time domain signal;
   said random phase generating means, said multiplying means, said inverse Fourier transform means, said phase shift means and said windowing means including means for repeating their operation to obtain plural windowed time domain signals; and
   overlapping means which overlaps the plural windowed time domain signals for outputting a digital drive signal;
   a D/A converter for converting the digital drive signal from the overlapping means into an analog drive signal and for outputting the analog signal to control the operation of a vibration generator.

2. Vibration control system in accordance with claim 1 wherein,
   said random phase generating means outputs a signal representing set of random phases which varies with each repeat operation controlled by said repeating means.

3. Vibration control system in accordance with claim 1 wherein,
   said random phase generating means outputs a signal representing the same set of random phases with each repeat operation controlled by said repeating means.

4. Vibration control system in accordance with claim 1 wherein,
   said random phase generating means outputs a signal representing a set of random phases which varies with each repeat operation controlled by said repeating means in a true random mode and is the same with each repeat operation controlled by said repeating means in a pseudo random mode.

5. Vibration control system in accordance with claim 1, wherein,
   said phase shift means is provided after the windowing means.

6. Vibration control system in accordance with claim 1, wherein,
   said phase shift means is provided between the random phase generator and the multiplying means.

7. Vibration control system in accordance with claim 1, wherein,
   said windowing means is provided before the inverse Fourier transform means and thus the windowing operation is carried out in the frequency domain.

8. Vibration control system in accordance with claim 4 wherein,
   said windowing means provides the window function value satisfying following condition:

$$\frac{\text{window function value for a true random mode}}{\text{window function value for a pseudo random mode}} = \sqrt{M/B}$$

where M is a total overlap number, and $$B = \left( \sum_{i=1}^{N} w^2(i)/N \right) \Big/ \left( \sum_{i=1}^{N} w(i)/N \right)^2.$$

9. Vibration control system, comprising:

sensing means for sensing a movement of a test object;
an A/D converter for converting a detected signal from said sensing means into a digital response signal;
Fourier transform means which converts the digital response signal into a response spectrum amplitude signal and outputs the response spectrum amplitude signal;
means for generating a reference spectrum amplitude signal from given reference power spectral density data;
computing means which calculate a drive spectrum amplitude using the response spectrum amplitude and said reference spectrum amplitude signal, and outputs a drive spectrum amplitude signal;
random phase generating means for outputting a signal representing a set of random phases;
multiplying means which calculates a drive spectrum by multiplying components of the drive spectrum amplitude signal by the random phase factor signal from the random phase generating means;
inverse Fourier transform means which converts the drive spectrum into a time domain signal;
phase shift means for shifting the phase of the time domain signal;
windowing means for windowing the time domain signal to obtain a windowed time domain signal;
overlapping means which overlaps plural windowed time domain signals for outputting a digital drive signal;
a D/A converter for converting the digital drive signal from the overlapping means into an analog drive signal and for outputting the analog signal to control the operation of a vibration generator;
said windowing means using the following window function $w(t)$:

$$w(t) \begin{cases} = a_o + \sum_{k=1}^{R} (a_k \cos\omega_k t + b_k \sin\omega_k t), & 0 \leq t \leq T \\ = 0, & \text{elsewhere} \end{cases}$$

where
T is the time length of one frame
$\omega_1 = 2\pi/T$ and
$\omega_k = \omega_1 \cdot k$, $k = 1,2,3,\ldots R$
wherein, the window function satisfies both of the following two conditions:
$a_k$ is substantially zero and $b_k$ is substantially zero when $$k = nM \quad \text{(condition I)}$$

$$R < M/2 \quad \text{(condition II)}$$

where
n is a natural number and
M is a total overlap number.

10. Vibration control system in accordance with claim 8, wherein,
said window function $w(t)$ is as follows:

$$w(t) = 0.5 + 0.5 \cos\omega_1 t.$$

11. Vibration control method comprising:
obtaining a response spectrum amplitude from test object vibrated by a vibration generator,
generating a reference spectrum amplitude,
obtaining a drive spectrum amplitude by comparing the response spectrum amplitude with the reference spectrum amplitude, and
applying a drive signal having the drive spectrum amplitude to the vibration generator,
wherein
the response spectrum amplitude is obtained by applying a white noise composed of a pseudo random signal to the vibration generator,
then, comparing the response spectrum amplitude with the reference spectrum amplitude for obtaining the drive spectrum amplitude and applying drive signal having the drive spectrum amplitude which is a pseudo random signal to the vibration generator, and
observing any change of the response spectrum amplitude and outputting true random signal having the determined drive spectrum amplitude to control the operation of the vibration generator after the response spectrum amplitude being within an allowance range of the reference spectrum amplitude.

* * * * *